United States Patent [19]

Brown et al.

[11] Patent Number: 4,871,004

[45] Date of Patent: Oct. 3, 1989

[54] RUBBER CONTAINING ARAMID PULP REINFORCEMENT

[75] Inventors: Robert J. Brown, Cuyahoga Falls; Richard M. Scriver, Atwater, both of Ohio

[73] Assignee: The Goodyear Tire & Rubber Company, Akron, Ohio

[21] Appl. No.: 156,769

[22] Filed: Feb. 17, 1988

[51] Int. Cl.$^4$ .............................. B60C 9/18; C08K 3/00
[52] U.S. Cl. ................................. 152/209 R; 152/527; 152/548; 524/495; 524/514
[58] Field of Search ............... 152/451, 526, 527, 537, 152/548, 547, 546, 556, 209 R, 532; 428/113, 263, 911, 295, 297; 57/902; 524/514, 495, 494, 496, 452, 455; 156/296; 523/214; 264/108

[56] References Cited

U.S. PATENT DOCUMENTS

| 3,697,364 | 10/1972 | Boustany et al. |
|---|---|---|
| 3,802,478 | 4/1974 | Boustany et al. |
| 4,155,394 | 5/1979 | Shepherd . |
| 4,236,563 | 12/1980 | Moers et al. |
| 4,483,381 | 11/1984 | Scriver . |
| 4,514,541 | 4/1985 | Frances .............................. 524/514 |
| 4,623,574 | 11/1986 | Harpell et al. ...................... 428/113 |
| 4,659,754 | 4/1987 | Edwards et al. ................ 524/455 X |
| 4,691,752 | 9/1987 | Kabe et al. ....................... 152/537 X |

OTHER PUBLICATIONS

"Kevlar", Aramid—The Fiber that Lets You Re-Think Strength and Weight, Product Bulletin E—38532 (undated) published by E. I. Du Pont de Demours & Co. (24 pages).

Modern Plastics Encyclopedia, 1984–1985, pp. 125–126, published by McGraw-Hill, Inc., New York, N.Y., 1984.

Foldi & Cooper, Journal of Industrial Fabrics, vol. 1, No. 2, Autumn 1982.

*Primary Examiner*—Raymond Hoch
*Attorney, Agent, or Firm*—Louis F. Kreek, Jr.; Henry C. Young, Jr.

[57] ABSTRACT

Aramid-reinforced elastomers, including rubber, in which the elastomer is reinforced with aramid in the form of short, discontinuous, fibrillated fibers, are disclosed. The fibers are composed of a trunk portion having a length of about 0.2–5 mm, a diameter of about 0.005–0.02 mm (5–20 micrometers), and an aspect ratio greater than 100, and numerous fibrils extending outwardly from the trunk and having diameters substantially smaller than the trunk diameter. The surface area of the fibers is from about 4 to about 20 square meters per gram, and is about 30 to 60 times the equivalent surface area of fibers in the form of rod having the same diameter distribution as that of the trunks of the fibers herein, but with no fibrils. The fibers are oriented. Incorporation of the fibers results in substantial increase in stiffness and modulus. Loading of aramid fibers is typically about 0.2–20 phr. Vulcanized reinforced elastomers of this invention are especially suitable in pneumatic tires, and most particularly as carcass plies and reinforcing belts between the tread and carcass in radial tires.

25 Claims, 6 Drawing Sheets

RUBBER CONTAINING ARAMID PULP REINFORCEMENT

TECHNICAL FIELD

This invention relates to fiber-reinforced elastomers and particularly rubber reinforced with short discontinuous fibers. The invention particularly relates to fiber reinforced rubber tires.

BACKGROUND ART

Rubber is normally reinforced with selected reinforcing fillers to enhance its physical properties, particularly stiffness and modulus.

Particulate reinforcement such as, for example, carbon black is often used to enhance the modulus of rubber vulcanizates.

Various discontinuous (non-woven) fibers have also been used, particularly to enhance both stiffness and modulus of rubber vulcanizates. For example, discontinuous cellulose fibers have been used as dispersions thereof in rubber as disclosed for example in U.S. Pat. Nos. 3,697,364, 3,802,478, and 4,236,563. Other discontinuous fibers have been suggested or used such as, for example, polyamide (nylon), cotton, rayon, polyester, glass and steel.

It has sometimes been taught that, for good and effective elastomer reinforcement, a high aspect ratio, or length to diameter (L/D) ratio of the fiber was important. Thus, for typically described fibers with a rod-like, needle-like or thread-like structure, it was first desired that they be very short and also to have very small diameter, in order to achieve, for example, an aspect ratio of about 50 or higher; see for example U.S. Pat. No. 3,697,364 previously cited.

Normally, where discontinuous fibers are used, the rubber composite also contains a particulate reinforcement in combination therewith.

Aramid in the form of strands of woven yarns, is well known as a fibrous reinforcing agent. Various grades are available, e.g. "Kevlar", "Kevlar" 29, and "Kevlar" 49, all available from E. I. Du Pont de Nemours & Co., Inc., Wilmington, Del. "Kevlar" is available as continuous filament yarn, short fiber and pulp according to the manufacturer. Cords of stranded "Kevlar" are used in the belts of radial car tires and carcasses of radial truck tires. "Kevlar" 29 is available in staple length and as a pulp, and, according to "Modern Plastics Encyclopedia", 1984–1985, page 125, is a low density, high strength aramid fiber used in ropes, cable, coated fabrics, friction products such as brakes and clutches, and in gaskets. "Kevlar" 49 according to "Modern Plastics Encyclopedia" is available either as a yarn or a pulp, and is used as a reinforcement for plastic composites, e.g. in aircraft, aerospace, marine and automotive applications, and in sports equipment. Aramid in any of its forms is essentially inextensible.

U.S. Pat. No. 4,155,394 describes cord composites for rubber tire reinforcement comprising a plurality of plies of different yarns, e.g. nylon and aramid, which are helically twisted to form a cable.

DISCLOSURE AND PRACTICE OF THE INVENTION

In accordance with this invention, there is provided a composition which comprises a vulcanizable elastomer having an effective reinforcing amount of directionally oriented, discontinuous, discrete fibrillated aramid fibers dispersed therein. Said fibers are composed of (a) a trunk portion having a length in the range of about 0.2 to about 5 mm (about 0.01–0.2 inches), a diameter in the range of about 0.005 to about 0.02 mm (5–20 micrometers) and an aspect ratio greater than about 100, and (b) a plurality of fibrils extending outwardly from said trunk and having diameters substantially smaller than the diameter of the trunk from which they extend. The fibers have a surface area in the range of about 4 to about 20 square meters per gram, and about 30 to about 60 times the equivalent surface area of rods having the same diameter distribution as the trunks of the fibers herein, but having no fibrils extending therefrom. These fibers are essentially inextendible as previously mentioned. For convenience, these discontinuous, discrete fibrillated aramid fibers will be referred to herein as "aramid pulp".

This invention according to another aspect provides a vulcanized composite comprising a vulcanized elastomeric matrix material having dispersed therein oriented discontinuous fibrillated aramid fibers (i.e. aramid pulp) as described above. The preferred elastomeric matrix material is rubber.

This invention according to still another aspect provides a pneumatic tire having at least one component formed of a vulcanized composite as described above. In the practice of this invention, it is desired that the vulcanizable composition and the vulcanized composite prepared therefrom, have a concentration of said aramid pulp from about 0.2 to about 20 parts by weight based on 100 parts of elastomer. More particularly, the concentration of aramid pulp may be from about 0.1 to about 10 parts by weight, and most particularly from about 2 to about 5 parts by weight, per 100 parts of elastomer. The aramid fiber are directionally oriented, i.e. they are substantially oriented in substantially the same direction.

According to preferred embodiments of the invention, the unvulcanized composition and vulcanized composite prepared therefrom contain a particulate reinforcing agent or mixture thereof in addition to aramid pulp. Preferred reinforcing agents are carbon black and silica. An effective amount of reinforcing agent or mixture thereof, preferably from about 30 to about 100 parts by weight per 100 parts of elastomer, is present.

This invention according to a further aspect provides a process for preparing a vulcanized composite as described above. This process comprises the steps of premixing the entire quantity of aramid pulp with at least a portion of the reinforcing agent or mixture thereof mixing the resulting mixture with the vulcanizable elastomeric material, and curing the resulting composition. The reinforcing agent or mixture thereof acts as a partitioning agent, greatly facilitating mixing of the aramid pulp with the elastomer.

Throughout the specification and claims, all amounts are given on the weight basis unless the contrary is expressly stated. Also, "phr" throughout the specification and claims shall denote parts by weight per 100 parts by weight of elastomer.

BEST MODE FOR CARRYING OUT THE INVENTION

Figures 1, 2, 3, 4:
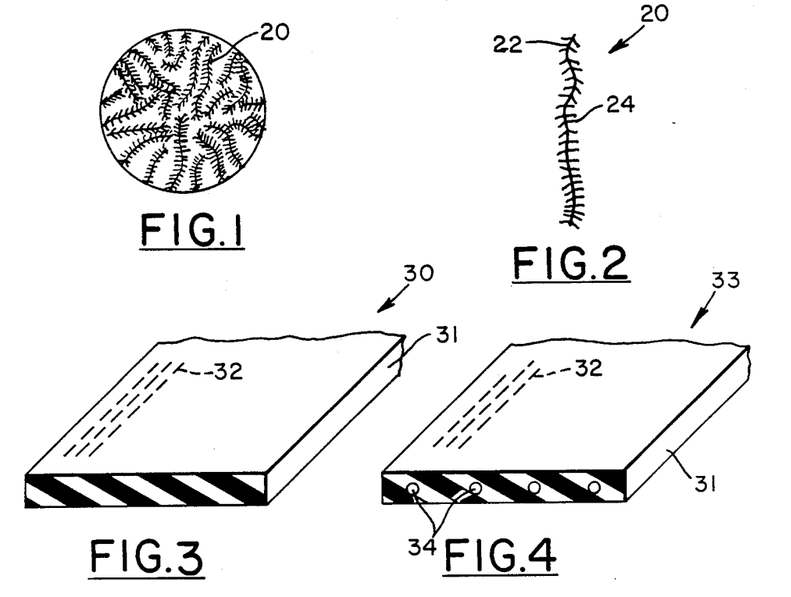
FIG. 1 is a schematic view on a greatly enlarged scale, showing the random, unoriented state of aramid fibers prior to compounding with rubber.
FIG. 2 is a schematic view of a single aramid fiber on an even more greatly enlarged scale.
FIG. 3 is a schematic representation of a sheet of aramid-reinforced belt having oriented discontinuous aramid fibers therein according to this invention.
FIG. 4 is a schematic representation of a single ply reinforcing belt having continuous reinforcing cords and oriented discontinuous aramid fibers therein according to this invention.

Referring now to FIGS. 1 and 2, the aramid fibers 20 used in the practice of this invention are composed of a trunk portion 22 having a length in the range of about 0.2 to about 5 mm, a diameter in the range of about 0.005 to about 0.02 mm (i.e. about 5 to about 20 micrometers) and an aspect ratio greater than about 100, and a plurality of fibrils 24 extending outwardly from the trunk along the entire length thereof and having diameters substantially smaller than the diameter of the trunk from which they extend. The fibers are in the form of a dry pulp prior to compounding. The surface area of the fibers is from about 4 to about 20 square meters per gram. Most of the surface area is attributable to the fibrils; the surface area of fibers used in the practice of this invention is about 30 to 60 times that of rod-like fibers having the same diameter distribution as that of the fibers used in this invention but with no fibrils.

Short, discontinuous fibrillated aramid fibers having the required characteristic for use in this invention are commercially available from E. I. du Pont de Nemours & Co., Wilmington, Del., as a pulp under name "Kevlar" 29. This material is in the form of extremely short fibrillated fibers having an average length of about 2 mm, a trunk diameter of 12 micrometers and a large number of fibrils having diameters less than one micrometer extending generally laterally from the trunk. These fibers have a surface area of 8 to 10 square meters per gram, which is 40 to 50 times that of rods having a diameter of 12 micrometers. Fibrillation (i.e., the presence of fibrils) is responsible for this increase in surface area.

The aramid material is typically characterized as a long chain synthetic aramid polyamide in which at least 85 percent of the amide linkages are attached directly to two aromatic rings. Aramid is primarily poly(paraphenyleneterephthalamide).

Aramid in any of its various physical forms is essentially inextensible. This is shown by high tensile modulus and low elongation at break. Modulus and elongation data are given in U.S. Pat. No. 4,155,394 cited supra and in a product bulletin entitled "KEVLAR aramid", published by E. I. duPont de Nemours & Co., Inc. While values vary depending on grade (e.g., "Kevlar", "Kevlar" 29 or "Kevlar" 49), physical form (e.g. yarn, chopped fiber, etc.) and presence or absence of impregnant, commercial aramid generally has a tensile modulus of at least about 6,000,000 pounds per square inch (about 40,000 megapascals) and an elongation at break not greater than about 5 percent.

Various rubbers can be used for the composite of this invention, as well as mixtures thereof, such as, for example, natural and synthetic cis 1,4-polyisoprene, polybutadiene (solution and emulsion), styrene/butadiene copolymers (solution and emulsion), butyl and halobutyl rubbers, EPDM rubbers, butadiene/acrylonitrile rubbers, neoprene, vinyl polybutadiene and viscoelastic polymers generally.

The loading of aramid pulp in both the unvulcanized mixtures and the vulcanized composites prepared therefrom, is in the range of about 0.2 to about 20, preferably from about 1 to about 10, most preferably from about 2 to about 5 parts by weight per 100 parts of elastomer (phr). Little reinforcing effect is observed at loadings below 0.2 phr. More effective reinforcement is observed when the pulp loading is at least 1 phr, more especially at least 2 phr. Preferred aramid pulp loadings depend on the intended use of the composite, as will be described in detail later.

Vulcanized composites of this invention generally exhibit an essentially linear stress/strain behavior at low elongation. Both modulus and maximum tensile load or stress (i.e., yield strength) generally increase with increased aramid fiber loading within the range of this invention. This will be discussed in greater detail subsequently with reference to FIG. 13 and Example 1. Strength and modulus are greater in the direction of fiber orientation than in the cross direction.

Green strength of unvulcanized compositions also tends to increase with increased aramid pulp loading especially at lower fiber loading within the range of this invention. Stiffness of unvulcanized compositions of this invention increases with increased aramid pulp loading. Unvulcanized mixtures having loadings over 20 phr are very stiff and difficult to process. Uncured compositions containing from about 10 to 20 phr may be difficult to handle in conventional rubber processing equipment (Banbury mixers and extruders for example) because of stiffness (which is also affected by other compounding ingredients present). However, such compositions can be handled with the aid of heavy duty equipment and/or low processing speeds.

Compositions of this invention also contain conventional compounding ingredients such as sulfur, accelerator(s), activators, antidegradent(s), zinc oxide and stearic acid. The compositions may also contain conventional reinforcing fillers such as, for example, carbon black, silica or clay. Other ingredients, such as peptizers, color pigments and the like, may also be included.

These conventional ingredients can be used in conventional amounts. For example, carbon black present in quantities from about 30 to about 100 phr. Compositions comprising a vulcanizable elastomer, curatives, about 0.2-20 phr (preferably about 1-10 phr, most preferably about 2-5 phr) of aramid fibers and about 30-100 phr of carbon black, and the cured elastomers obtained therefrom represent preferred compositions according to this invention. Carbon black, which is in particulate form, is generally the preferred reinforcing material. Other particulate reinforcing agents, such as silica (preferred) or clay, can be used when a non-black (i.e. white or colored) elastomer is desired. (A white sidewall tire is an example). Mixtures of reinforcing agents, e.g. carbon black and silica, are also useful. The total amount of reinforcing agent(s) is sufficient for effective reinforcement, preferably from about 30 to about 100 phr (parts of reinforcing agent per 100 parts of elastomer).

It is preferred to premix the entire quantity of aramid pulp with at least part of the reinforcing agent or mixture thereof (e.g., carbon black), in order to handle the aramid pulp more easily and to facilitate its dispersion in rubber (or other elastomer). The reinforcing agent or mixture thereof acts as a partitioning agent. Aramid pulp fibers, because of their fluffy nature, disperse with difficulty if not so premixed. Either all or part of the carbon black may be premixed.

The rubber may be compounded with the aramid fibers (preferably premixed with carbon black) and other compounding ingredients according to conventional methods using conventional processing equipment, for aramid fiber loading up to about 10 phr. Mixing equipment may include one or more Banbury mixers. Usually more than one mixing stage is desirable.

The compounded rubber may be calendared or otherwise shaped or extruded under shear conditions. A preferred shaping apparatus is a four-roll calendar although two or three roll calendars and other types of shear producing shaping apparatus, as for example an extruder may be used. Calendar rolls are generally preferred when a sheet is desired, and an extruder is generally preferred when a shaped component is desired. Shear conditions in the shaping apparatus cause the fibers to assume an oriented configuration. The sheet, as formed, may be of desired thickness, depending on the intended use. It is an important feature of this invention that the aramid fibers are oriented in the calendared or extruded mixture and in the vulcanizate which is formed on curing. The aramid fibers are oriented in substantially parallel, unidirectional configuration in the lengthwise direction of a calendared sheet, or in the direction of extrusion in an extruded part.

Special processing equipment and/or conditions may be necessary or desirable for preparing uncured compositions containing more than about 10 phr of aramid pulp because of the stiffness of such compositions. For example, heavy duty mixers and extruders, higher than normal operating temperatures, and/or low processing speeds, may be used. The threshold aramid fiber concentration above which special equipment and/or handling are required may vary, depending on the other ingredients (notably carbon black) present in the rubber compound.

FIG. 3 shows schematically a calendared or extruded sheet in accordance with this invention. In FIG. 3, 30 is a calendared or extruded sheet having an elastomer matrix 31 and a plurality of oriented discontinuous aramid fibers 32 therein. Such a sheet is useful in forming tire belts as will be subsequently described., A sheet or belt of this nature may be called a restrictor in accordance with art-recognized usage.

FIG. 4 shows a composite sheet 33 comprising a compounded rubber matrix 31 having oriented short discontinuous aramid fibers 32 dispersed therein and reinforcing cords 34 embedded therein. Cords 34 may be of steel or other metallic wire, glass, polyester or nylon, or other reinforcing material in the form of a long, continuous wire or yarn. FIG. 4 is representative of such composites in both the unvulcanized and the vulcanized states. As shown in FIG. 4, the reinforcing wires or cords 34 extend parallel to the fibers 32. Of course, the oriented fibers 32 and the reinforcing wires 34 may be disposed at an angle (especially at right angles) to each other. Sheet 33 may be prepared according to known methods for building fabric-reinforced belts and carcass plies. Cords 34 are embedded in a calendared green sheet.

Figures 5, 6:
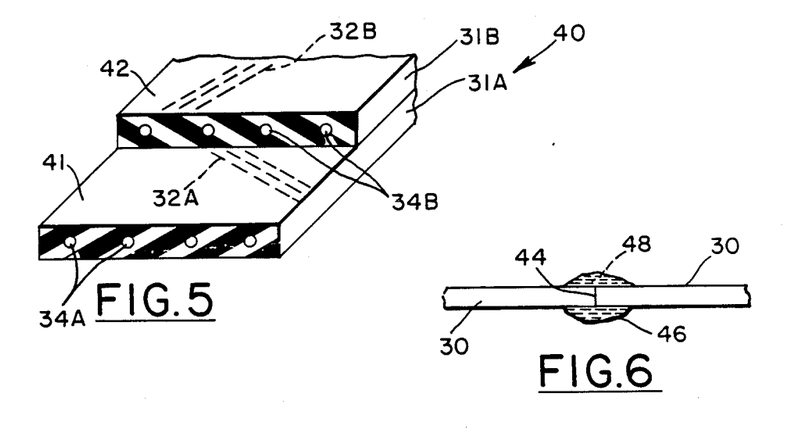
FIG. 5 is a schematic representation of a two-ply reinforcing belt having oriented aramid fibers therein according to this invention.
FIG. 6 is a schematic side elevational view of a butt splice joining together the two ends of a reinforcing ply.

For some purposes a laminate of two or more plies is desired. FIG. 5 shows schematically a two-ply laminate 40 having a first layer 41 comprising oriented aramid fibers 31A and reinforcing cords 34A in an elastomer matrix 31B, and a second layer 42 comprising oriented aramid fibers 32B and reinforcing wires or cords 34B in an elastomer matrix 34B. In embodiment illustrated in FIG. 5, cords 34A and 34B extend in the lengthwise direction of their respective sheets 41 and 42, and the direction of aramid fibers in each ply is on the bias, i.e. at an acute angle with respect to the cords. The fiber direction may be either parallel to or at an angle (up to 90°) with respect to the cord direction. Reinforcing cords 34a, 34b when present, are preferably parallel to the fibers in their respective plies. These cords may be included or omitted as desired. The aramid fibers 32a and 42a in the two layers may be disposed at any desired angle with respect to each other; however, maximum reinforcement in both the lateral an circumferential directions is achieved when respective fibers therein are oriented at 90° with respect to each other.

The calendared sheet may be cut at any desired angle ranging from 0° to 90° with respect to the direction of orientation of the aramid fibers. Maximum circumferential stability is obtained at 0° and maximum lateral stability is obtained at 90°. Cutting at angles other than 0° is especially useful for formation of laminates of two or more plies.

FIG. 6 shows a butt splice joining together the two ends of a sheet 30. When an aramid fiber-reinforced sheet 30 is used as a tire carcass ply or belt, the sheet extends around the circumference of the tire in toroidal fashion, and the ends 44 thereof are in touching engagement. These ends 44 may be held together with a gum strip 46 which overlies the ends and forms the splice which holds the ends together. Gum strip 46 may be an elastomer which is reinforced with oriented short discontinuous aramid fibers 48 in accordance with this invention. The fiber direction is preferably perpendicular to ends 44. Composite cord-reinforced sheets 33 and laminates 40 may also have their ends joined together by means of a butt splice as shown in FIG. 6.

Aramid fiber-reinforced sheets and extruded shapes in accordance with this invention, including single ply composites as shown in FIGS. 3 and 4, and multi-ply laminates as shown in FIG. 5, may be used in forming various compounds of a tire, as will now be described in further detail with particular reference to FIGS. 7 to 12. The tire may be built and then cured under conditions of heat and pressure in a tire mold, both under conventional conditions, using aramid-reinforcing rubber composites of this invention at the specified locations.

FIGS. 7-12 show a cured tire according one embodiment of this invention. A radial tire has been used for purposes of illustration. While radial tires are preferred in the practice of this invention, the invention is not confined thereto but may also be practiced in bias ply and other types of tires.

Figure 7:
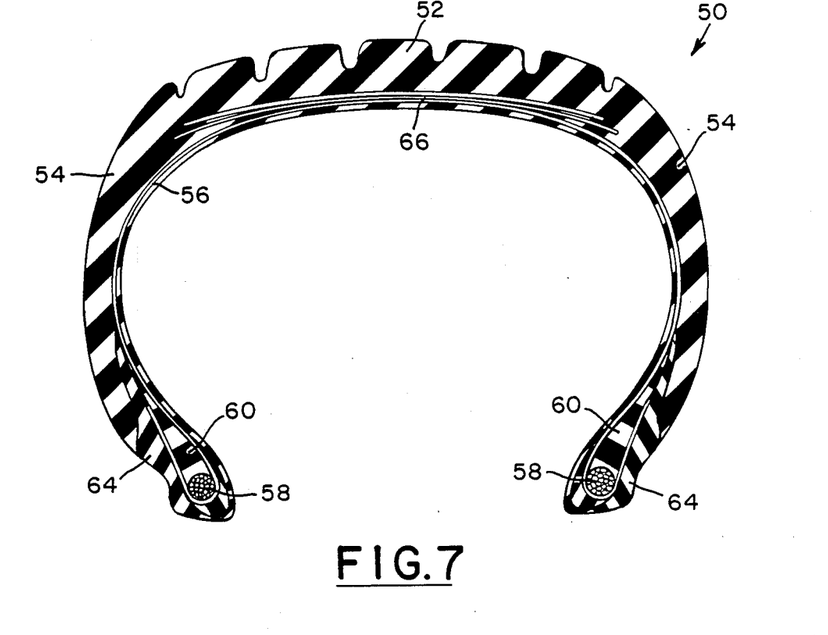
FIG. 7 is a cross-sectional view of a pneumatic tire according to this invention, showing carcass plies and reinforcing belts therein.

Referring to FIG. 7, radial tire 50 has a tread portion 52, sidewalls 54, and a carcass 56 which typically comprises a plurality of radially extending reinforcing wires or cords of, for example, steel, nylon, polyester, rayon, glass, etc., embedded in a rubber matrix. The carcass 56 may consist of one or more plies; one ply is shown here. The ends of carcass 56 extend around bead wires 58 and are folded back in the conventional manner. In proximity with the beads 58 are a pair of apexes 60 and filler strips 62 shown only in FIG. 8) and chafers 64. A plurality of circumferentially extending fabric reinforced rubber belts 66 are interposed between tread 52 and carcass 56. The lateral edges of belt 66 may be covered either by belt coat or overlay 68 (shown in FIG. 11), which extends the entire width of belt 66 and is interposed between these belts and tread 52, or by belt edge gum strips 70 (shown in FIG. 12). An inner liner 74 (shown in FIG. 10), typically made of butyl or halobutyl rubber, may be provided for the purpose of improving the air retention properties of the tire.

Aramid-reinforced rubber composites of this invention may be used to prepare any or all of the following components of tire 50: apexes 60, filler strips 62, belts 66, belt overlay 68, and gum strips 70. These may be characterized as structural reinforcing components of a tire, and are particularly benefitted by the present invention. In general, any rubber component of the tire in which stiffness and/or high modulus (i.e. high load bearing capability at low elongation are desirable, may be prepared from the aramid-reinforced rubber composite of this invention. The aramid reinforcement of this invention is used in addition to conventional reinforcing elements, such as particulate reinforcement and reinforcing cords, in tire rubber compositions.

The desired aramid pulp loading in aramid-reinforced rubber composites of this invention depends on the tire component in which the composite is to be used. In general, aramid pulp loadings less than 5 phr are used in all tire components except apexes 60. High stiffness is desirable in the apexes in order to reduce cyclic strain at the ends of the carcass ply (or plies) 56 and thereby prolong tire life, and so aramid pulp loadings in excess of 5 phr (generally from 5 to 10 phr) are desirable for this component. When an aramid-reinforced composite of this invention is to be used for a non-tire purpose, aramid pulp loading depends on the intended use, and for most purposes is less than about 5 phr.

The rubber (or other elastomer) stock, and compounding ingredients other than aramid fibers, in the above-listed tire components may be in accordance with conventional practice in the art.

Figure 8:
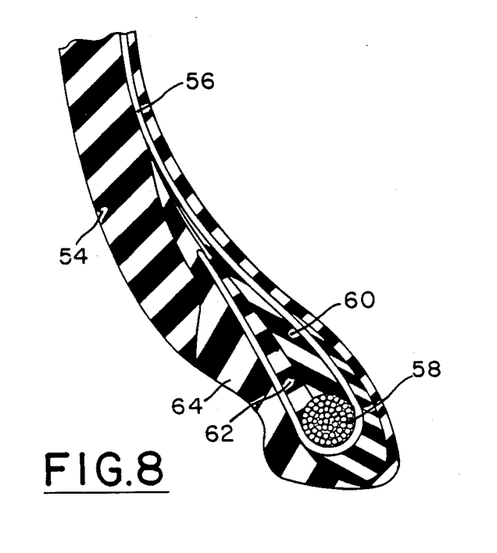
FIG. 8 is a cross-sectional view, on an enlarged scale, of a sidewall portion of the pneumatic tire shown in FIG. 7.
Figure 9:
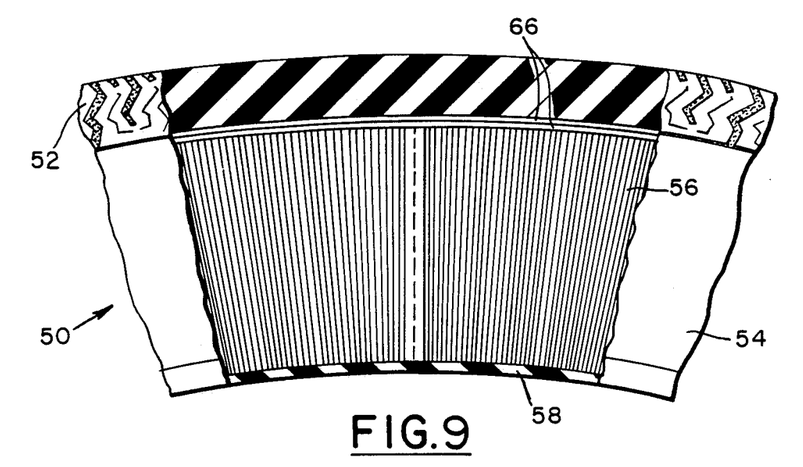
FIG. 9 is a front view, with parts broken away and parts shown in section of a tire according to this invention.
Figure 10:
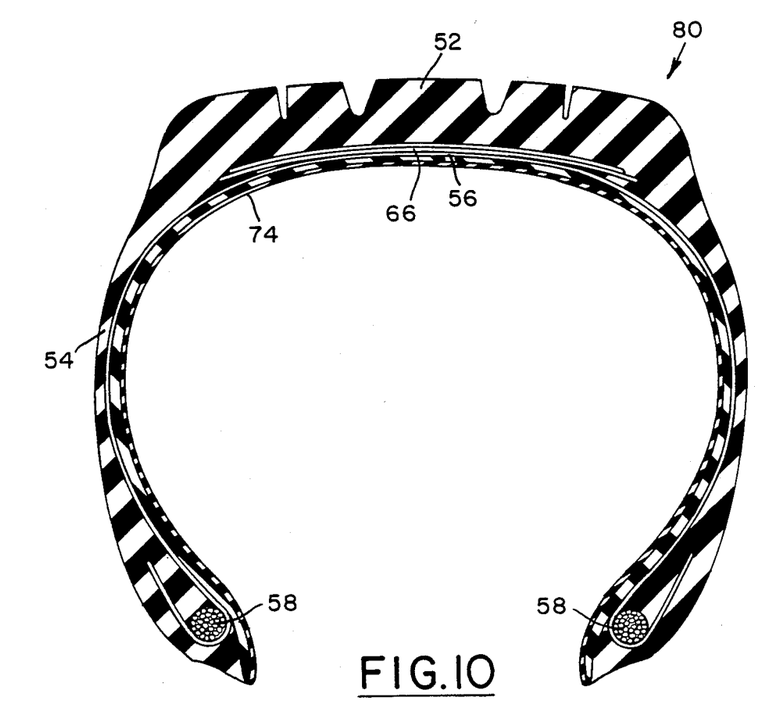
FIG. 10 is a cross-sectional view of a pneumatic tire according to a modified form of this invention.

Apexes 60 and filler strips 62 are toroidal members of generally triangular cross-section which extend radially outwardly from beads 58 and diminish in thickness as they extend outwardly. They are encompassed by a fabric-reinforced carcass ply 56. The aramid fibers therein are preferably radially oriented. No reinforcing wires or yarns are used.

Belts 66 may be made of rubber/aramid composite sheets of this invention. The materials and construction of belts 66 may be similar to those shown and described in U.S. Pat. No. 4,483,381, in which the reinforcing belt rubber is preferably a blend of medium vinyl polybutadiene rubber and natural and/or synthetic bis-1,4-polyisoprene rubber, and a fabric reinforcement is in the form of steel cords encapsulated within the rubber stock. Natural rubber and natural rubber/SBR (styrene-butadiene rubber) blends can also be used.) In short, each of the belts 66 may be in the form of a single ply cord-reinforced rubber/aramid composite as shown in FIG. 3. Alternatively, belt 66 collectively may be in the form of a two-ply or multiple ply rubber/aramid composite construction as shown in FIG. 5. In either case, it is preferable that the aramid fibers be oriented on the bias, and that the aramid fibers in adjacent belt layers not be oriented in the same direction.

Figure 11:
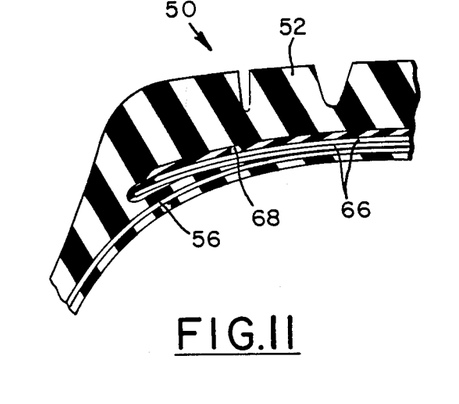
FIG. 11 is a partial cross-sectional view showing parts of the tread and adjacent sidewall portions of a tire according to a third form of the invention.
Figure 12:
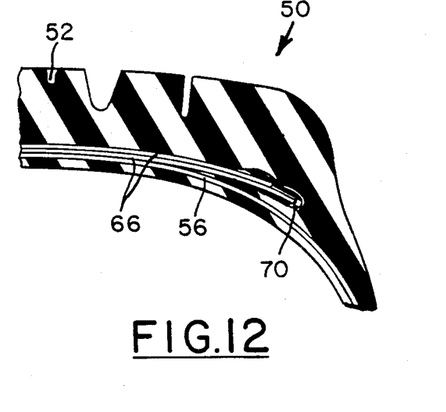
FIG. 12 is a partial cross-sectional view showing part of the tread and adjacent sidewall portions according to the embodiment shown in FIG. 7.

Belt overlay 68 and belt edge gum strips 70 may also be made from aramid-reinforced calendared rubber sheets of this invention. Suitable rubbers in general are the same as those used in making belts. Fabric reinforcement may or may not be used as desired. The aramid fibers are preferably circumferentially oriented. Increased stiffness of belt overlays according to this invention is desirable in order to reduce movement of the ends of the belts 66.

Tire tread 52 may be made of an aramid-reinforced rubber according to this invention, although stiffness imparted by aramid fibers is generally less important in tire treads than in the other tire components discussed above. Composites used for tire treads typically have low aramid fiber loadings, e.g., not over about 5 phr and preferably about 0.2 to 2 phr, in order to avoid undue stiffness while improving crack resistance Except for use of rubber/aramid composites according to this invention as above described, either with or without fabric or cord reinforcement, the tire 50 shown in the drawings may be of conventional construction.

Figure 13:
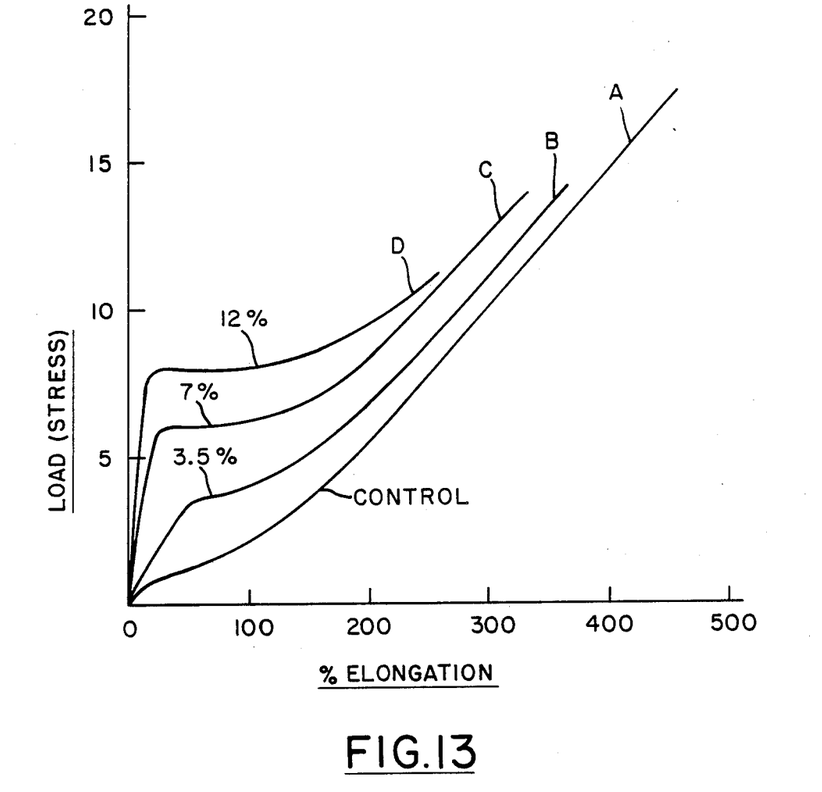
FIG. 13 is a stress/strain diagram of vulcanized composites according to this invention having various aramid fiber loadings; the stress/strain diagram of a control (unreinforced rubber) is also shown.

Vulcanized aramid/reinforced rubber composites of this invention exhibit high tensile strength and high modulus at low elongation in the direction of fiber orientation. These composites are anisotropic and exhibit lower strength and modulus in the cross direction than in the fiber direction. Yield strength and modulus increase with aramid fiber loading, as shown in FIG. 13. This figure will be discussed further with reference to Example 1. Also, as shown in FIG. 13, rubber/aramid composites of this invention exhibit a virtually linear stress/strain relationship, similar to those of metals below their elastic limit, at low elongations.

A particular feature of this invention resides in the reinforcing effect obtained at low elongations, as shown by the steeply sloping stress-strain curves in FIG. 13. This feature is especially useful in real life in practical applications, where a large degree of stiffness or stability (i.e. minimal deformation under a given tensile load) is desired. In particular, composites of the present invention are beneficial in pneumatic rubber tires, where stability is desired at low elongation, e.g. at 5-50 percent elongation.

Rubber/aramid composites of this invention also have high stiffness under compressive stress, as measured by compression modulus. Reinforcement of rubber with aramid fibers according to this invention dramatically increases such stiffness with a minimum increase in hardness. Impact resistance, tear resistance, cut resistance and resistance to growth of cuts are also better in aramid-reinforced composites of this invention than in vulcanized rubber compositions which do not contain aramid pulp.

Rubber/aramid composites of this invention, particularly those for use in tires, commonly contain carbon black. The amount of carbon black may be from about 30 to about 100 phr. The loadings of both aramid fibers and carbon black are chosen in accordance with intended use and desired hardness of the composite. A particularly desirable property of vulcanized composites containing both aramid fibers and carbon black is good "low strain modulus", i.e., high modulus at low strains. Desired modulus is achieved more readily with both aramid fibers and carbon black than with either carbon black or aramid fibers alone. Other desirable properties of such composites include improved performance (e.g., higher loads and higher speeds in tires), low heat buildup, better cut resistance, greater durability, and longer life.

Uncured rubber/aramid composites of this invention have greater green strength and better dimensional stability than otherwise similarly compounded rubber containing no aramid fibers This invention will now be described in further detail with reference to the examples which follow.

EXAMPLE 1

Composites of rubber containing aramid pulps dispersed therein were prepared by first preparing a mixture comprising the ingredients shown in Table I below, followed by sulfur curing of the resulting product.

TABLE I

| Run | Amount, phr | | | |
|---|---|---|---|---|
| | A | B | C | D |
| Material | | | | |
| Butadiene-styrene rubber, oil extended (1) | | | | |
| Rubber | | 70.0 | | |
| Oil | | 26.3 | | |
| Polybutadiene rubber | | 30.0 | | |
| Processing oil | | 9.0 | | |
| Carbon Black | | 60.0 | | |
| Aramid pulp (2) | 0 | 3.5 | 7 | 12 |

Notes:
(1) Rubber composition: 70 parts butadiene-styrene rubber and 26.3 parts oil (total 96.3 parts)
(2) Obtainable from E. I. duPont de Nemours & Co. as "Kevlar 29" pulp.

Mixtures A through D also contained conventional compounding ingredients, e.g., sulfur, stearic acid, zinc oxide, antidegradants, and accelerator(s), in addition to the ingredients shown in Table I. All compounding ingredients other than aramid pulp were used in the same amounts in all four runs.

Samples of the cured composites were taken and tested for ultimate tensile strength and elongation according to ASTM test D412.

Results of the tensile and elongation tests in the fiber direction are shown in TABLE II below and are presented graphically in FIG. 13 for the purpose of more clearly demonstrating the invention. Stresses are shown in megapascals (MPa), i.e., meganewtons per square meter.

TABLE II

| Property | A | B | C | D |
|---|---|---|---|---|
| Stress, MPa, at yield point | 1.0 (a) | 3.4 | 6.0 | 8.0 |
| % Elongation at yield point | — | 50 | 20 | 18 |

Notes:
(a) At 50% elongation

FIG. 13 shows typical stress/strain diagrams (tensile stress in megapascals (MPa), vs. percentage elongation) of cured rubber samples both with and without the aramid fiber required by this invention. Curve A shows a control sample (no aramid fiber). Curves B, C and D demonstrate the stress-strain curves of rubber composites containing 3.5 phr, 7 phr and 12 phr, respectively, of aramid fiber. Inspection of curve B shows a rapid and substantially linear increase in tensile load vs. percentage elongation until about 50 percent elongation is reached, and that at higher elongations the curve assumes a more normal pattern. Curves C and D follow patterns similar to that of curve B except that the modulus of the composite (which is the slope of the stress-strain curve) at maximum stress (or load) in the linear region of the stress-strain curve, rise with increasing aramid fiber content.

A particular advantage of the high stress (and high modulus) values at low elongations is that this property enables the tire producer to use composites of this invention in high stress portions of the tire, so that only small deformation may take place even at substantial stress loads.

EXAMPLE 2

This example shows that greater improvement in stress/strain properties (i.e. greater increase in modulus) is obtained in rubber composites loaded with aramid fibers in accordance with the present invention than in rubber composites containing equal loading of other short, discontinuous fibers, none of which were fibrillated.

Runs AA (control), E, F and G were carried out in this example. Vulcanizate prepared in Run AA contained no fiber. Composites prepared in Runs E, F and G contained 5 phr of aramid pulp, cotton (cellulose), and polypropylene, respectively. Fiber contents are as shown in TABLE III below. Recipes are given in TABLE III below.

TABLE III

| Run | Fiber | phr |
|---|---|---|
| AA | none (control) | 0 |
| E | aramid (2) | 5 |
| F | cellulose (3) | 5 |
| G | polypropylene (4) | 5 |

Notes:
(2) Obtainable from E. I. duPont e Nemours & Co. as "Kevlar 29" pulp
(3) Obtainable from Monsanto Company as "Santoweb" DX.
(4) Obtainable from Hercules Inc. as "Pulpex" P.

Recipes, except for fiber content, were the same in runs AA, E, F and G. These recipes comprised the ingredients and amounts thereof shown in TABLE IV below, plus conventional compounding ingredients, e.g., sulfur, stearic acid, zinc oxide, antidegradants and accelerator(s).

TABLE IV

| Material | Parts |
| --- | --- |
| Natural rubber | 40 |
| Polybutadiene rubber | 60 |
| Processing oil | 15 |
| Carbon black | 50 |

Figure 14:
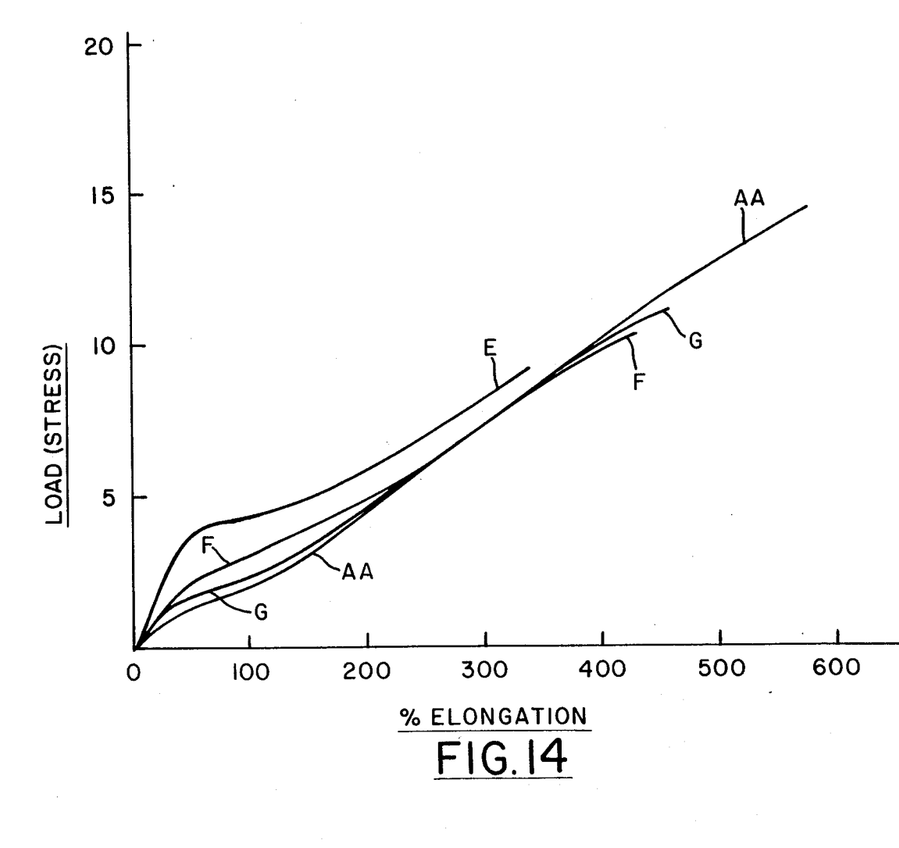
FIG. 14 is=a stress/strain diagram showing the stress/strain curves of rubber compounded with various short fibers, including aramid according to the present invention, all at 5 phr loading, as well as a stress/strain curve for unreinforced rubber.

Samples from each run were tested in the manner described in Example 1. Results are shown in TABLE V below and are displayed graphically in FIG. 14.

TABLE V

| Run | AA | E | F | G |
| --- | --- | --- | --- | --- |
| Stress, MPa, at yield point | — | 4.0 | 1.8 | 1.5 |
| % Elong. at yield point | — | 70 | 50 | 30 |

Table V shows the dramatic effect of utilizing aramid pulp according to this invention, as compared to cellulose fibers (sometimes suggested for the purpose of reinforcing rubber composites) or polypropylene fiber.

More specifically, short, discontinuous fibrillated aramid fibers (i.e., aramid pulp) imparted higher modulus at low elongations (up to about 50%) than did either cellulose or polypropylene fibers. Stated another way, application of a given tensile load produced less deformation (elongation) in aramid fiber composites than in composites prepared with other fibers. Yield strength was also higher in aramid reinforced composites than in composites reinforced with other fibers. Composites prepared with other fibers, in turn, imparted higher moduli than those observed in rubber containing no fiber reinforcement.

Rubber reinforced with short, discontinuous fibrillated aramid fibers according to the present invention possesses several advantages over rubber reinforced with short, discontinuous fibers of other materials.

First, short discontinuous fibrillated aramid fibers impart much greater strength and higher modulus in the fiber direction than do equal loadings of other fibers. This is shown in Example 2 and FIG. 14. While applicants do not wish to be bound by any theory, they believe that improved reinforcement is due to inextensibility and the presence of fibrils in the fibrillated aramid fibers used herein. It is believed that the fibrils of the aramid fiber interlock with the rubber matrix, inhibiting flexure and improving dimensional stability of the rubber.

Second, it is not necessary to use an adhesive or bonding agent in order to achieve an adherent composite structure. Tire cord materials including aramid filament or yarn must be pretreated with a surface adhesive to achieve effective bonding to rubber; see U.S. Pat. No. 4,155,394 in this regard. Discontinuous fibrous materials previously used also generally require use of an adhesive (which is typically applied to the fiber prior to its incorporation into rubber); see for example U.S. Pat. No. 3,697,364.

While this invention has been described with particular reference to pneumatic tires and most particularly with respect to radial tires, it will be understood that the fiber reinforced composites of this invention may be used in other applications where rubber, having high stiffness, is useful. For example, rubber composites of this invention may be used in making conveyor belts, hoses, solid industrial tires, off the road tire treads, roofing, flashing and pond lining. Either single ply constructions or constructions having two or more plies may be provided, depending on the application. These may be similar to the constructions shown in FIG. 3. Reinforcing wires or cords are generally omitted for purposes other than pneumatic tires. Other modifications will be apparent to those skilled in the art.

What is claimed is:

1. A process for preparing a vulcanized elastomer composite which comprises:
    (a) forming a premix consisting essentially of fibrillated aramid fibers and one or more particulate reinforcing agents selected from the group consisting of carbon black, silica and clay, said premix containing the entire quantity of aramid fibers desired in said composite and sufficient quantity of said reinforcing agent to cause partitioning of said aramid fibers and thereby promote subsequent compounding of said aramid fibers with elastomers, said aramid fibers being composed of
        (1) a trunk portion having a length in the range of about 0.2 to about 5 millimeters, a diameter in the range of about 0.005 to about 0.02 millimeters and an aspect ratio greater than about 100, and
        (2) a plurality of fibrils extending outwardly from said trunk and having diameters substantially smaller than the diameter of the trunk from which they extend, said fibers having a surface area in the range of about 4 to about 20 square meters per gram,
    (b) mixing said premix with a vulcanizable elastomeric matric material, additional amounts of said one or more particulate reinforcing agents and additional tire compounding ingredients in the absence of a solvent to form an unvulcanized elastomer composition, the quantity of said aramid fibers in said composition not exceeding 5 parts by weight per 100 of elastomer, and
    (c) curing the resulting composition.

2. A tire having a tread comprised of an aramid fiber-reinforced elastomeric composite prepared according to the process of claim 1 where the amount of aramid fiber is from about 0.2 to about 5 parts per 100 parts of elastomer in said composite.

3. A process according to claim 1 in which said vulcanized elastomer composite or a portion thereof forms a tire tread.

4. A process according to claim 1 further including the additional step of forming the unvulcanized elastomer composite prepared in step (b) into a tire tread, and thereafter curing said composite.

5. A process for building a tire containing one or more aramid-reinforced components including a tread, said process comprising:
    (a) forming a premix consisting essentially of fibrillated aramid fibers and one or more particulate reinforcing agents selected from the group consisting of carbon black, silicon, clay and mixtures thereof, said premix containing the entire quantity of aramid fibers desired in said composite and sufficient quantity of reinforcing agent to cause partitioning of said aramid fibers and thereby promote subsequent compounding of said aramid fibers with elastomer, said aramid fibers being composed of
        (1) a trunk portion having a length in the range of about 0.2 to about 5 millimeters, a diameter in the range of about 0.005 to about 0.02 millimeters and an aspect ratio greater than about 100, and
        (2) a plurality of fibrils extending outwardly from said trunk and having diameters substantially smaller than the diameter of the trunk from which they extend, said fibers having a surface area in the range of about 4 to about 20 square meters per gram, (b) mixing said premix with a vulcanizable elastomeric matric material, additional amounts of said one or more particulate reinforcing agents, and additional tire compounding ingredients in the absence of a solvent to form an unvulcanized elastomer composite, the quantity of said aramid fibers no exceeding 5 parts by weight per 100 of elastomer, and (c) forming the resulting unvulcanized elastomer composite or one or more portions thereof into one or more tire components, including a tread, in which aramid reinforcement is desired, (d) assembling said components into an uncured tire, and (e) curing the tire.

6. A process according to claim 5 in which the vulcanizable elastomeric matrix material is rubber.

7. A process according to claim 5 in which one of said tire components is the tread.

8. In a pneumatic tire comprising a plurality of components including a tire tread, a pair of sidewalls, a cord reinforced carcass, a pair of beads and one or more additional elastomeric structural reinforcing components, the improvement wherein at least one of said components comprises aramid fiber-reinforced vulcanized elastomeric composite comprising a matrix of cured elastomer, a reinforcing amount of a particulate reinforcing agent selected from the group consisting of carbon black, silica, clay and mixtures thereof, and an effective reinforcing amount not exceeding 5 parts by weight per 100 of elastomer, of short, discontinuous, fibrillated aramid fibers dispersed therein, said fibers being composed of (a) a trunk portion having a length in the range of about 0.2 to about 5 millimeters, a diameter in the range of about 0.005 to about 0.02 millimeters and an aspect ratio greater than about 100, and (b) a plurality of fibrils extending outwardly from said trunk and having diameters substantially smaller than the diameter of the trunk from which they extend, said fibers having a surface area in the range of about 4 to about 20 square meters per gram, said composite being prepared by a process which comprises (1) forming a premix consisting essentially of all of said aramid fibers with at least a portion and less than all of said particulate reinforcing agent or mixture thereof, the quantity of said reinforcing agent or mixture thereof being sufficient to cause partitioning of said aramid fibers and thereby promote subsequent compounding of said aramid fibers with elastomer, (2) mixing said premix with a vulcanizable elastomer, the remaining portion of said reinforcing agent or mixture thereof, and additional tire compounding ingredients and (3) curing the tire.

9. A tire according to claim 8 in which said tire includes a reinforcing belt between said carcass and said tread, said belt comprising at least one ply of said elastomeric composite.

10. A tire according to claim 9 in which said elastomeric composite further includes reinforcing cords extending therethrough.

11. A tire according to claim 8 in which said tire includes a belt overlay of said elastomeric composite.

12. A tire according to claim 8 in which said tire includes members of generally triangular cross section of said elastomeric composite extending radially outwardly from said beads.

13. A tire according to claim 8 in which said tire includes at least one toroidal member of generally triangular cross section of said elastomeric composite extending radially outwardly from said beads and diminishing in thickness as it extends outwardly.

14. A tire according to claim 8 in which the amount of said reinforcing agent or mixture thereof is from about 30 to about 100 parts by weight per 100 parts of said cured elastomer.

15. A tire according to claim 8 in which said reinforcing agent is carbon black.

16. A tire according to claim 8 in which said reinforcing agent is silica.

17. A tire according to claim 8 wherein said tread is a component thereof which comprises said aramid fiber-reinforced elastomeric composite and the amount of aramid fibers is in the range of 0.2 to 5 parts per 100 parts of elastomer in said composite.

18. A tire according to claim 15 wherein said aramid fiber-reinforced elastomeric composite is a tread thereof and the amount of aramid fiber is in the range of 0.2 to 5 parts per 100 parts of elastomer.

19. A tire according to claim 8 in which said cured elastomer is rubber.

20. A tire according to claim 8 in which reinforcing agent or mixture thereof and said additional tire compounding ingredients are conventional tire compounding ingredients and in which said mixing of said premix with said vulcanizable elastomer, said remaining portion of reinforcing agent or mixture thereof and said additional tire compounding ingredients is carried at in the substantial absence of additional materials.

21. A tire according to claim 8 in which said premix is mixed with said vulcanizable elastomer in the absence of a solvent.

22. A tire according to claim 8 in which the amount of aramid fibers is from 0.2 to 2 parts by weight, per 100 of elastomer.

23. A tire having a tread which comprises an aramid fiber-reinforced vulcanized elastomeric composite comprising a matrix of cured elastomer, a particulate reinforcing agent selected from the group consisting of carbon black, silica, clay and mixtures thereof, additional tire compounding ingredients and about 0.2 to about 5 parts by weight, per 100 parts of said elastomer, of short, discontinuous fibrillated aramid fibers being composed of (i) a trunk portion having a length in the range of about 0.2 to about 5 millimeters, a diameter in the range of about 0.005 to about 0.2 millimeters and an aspect ratio greater than about 100, and (ii) a plurality of fibrils extending outwardly from said trunk and having diameters substantially smaller than the diameter of the trunk from which they extend, said fibers having a surface area in the range of about 4 to 20 square meters per gram, said composite being prepared by a process which comprises (1) forming a premix consisting essentially of all of said particulate reinforcing agent or mixture thereof being sufficient to cause partitioning of said aramid fibers and thereby promote subsequent compounding of said aramid fibers with elastomer, (2) mixing said premix with a vulcanizable elastomer, the remaining portion of said reinforcing agent or mixture thereof, and said additional tire compounding ingredients and (3) curing the tire.

24. The tire of claim 23 wherein said reinforcing agent is comprised of carbon black and where said aramid fibers are mixed with at least a portion of said reinforcing agent prior to mixing with said elastomer and the vulcanization thereof.

25. The tire of claim 23 in which the amount of said aramid fibers is from 0.2 to 2 parts by weight, per 100 parts of rubber.

* * * * *